United States Patent

Membrino

[11] 3,889,449
[45] June 17, 1975

[54] OPENING, FILLING AND SEALING DEVICE FOR THERMOPLASTIC BAGS

[76] Inventor: Hercules Membrino, 1934 Arch St., Philadelphia, Pa. 19103

[22] Filed: Sept. 10, 1973

[21] Appl. No.: 395,542

[52] U.S. Cl. ............. 53/189; 53/266; 53/373; 53/385
[51] Int. Cl. ...... B65b 1/06; B65b 7/02; B65b 43/33
[58] Field of Search .............. 53/187–190, 53/384–386, 373, 266; 141/313, 391

[56] References Cited
UNITED STATES PATENTS

| 1,794,517 | 3/1931 | Hellman | 53/385 X |
| 2,721,015 | 10/1955 | Canales | 53/385 X |
| 2,842,921 | 7/1958 | Rasmusson | 53/189 |
| 3,156,273 | 11/1964 | Piazze | 53/189 X |
| 3,581,459 | 6/1971 | Elliott et al. | 53/385 X |

Primary Examiner—Robert L. Spruill
Attorney, Agent, or Firm—Arthur A. Jacobs, Esq.

[57] ABSTRACT

A filling and sealing device for thermoplastic and similar bags wherein the bag is releasably connected adjacent the outlet end of a filling chute, the bag being clamped against the outer periphery of the chute in a manner to partially bend the bag, this bending action causing a partial separation of the lip constituting the front edge of the mouth of the bag away from the rear of the bag so as to permit a blast of air or other gaseous fluid under pressure to pass over the lip of the bag and into the bag itself, thereby causing the bag to open sufficiently to receive a filler passing through the chute. The filled bag is then dropped between heat sealing means and retained in the heat sealing position until the neck of the bag has been sealed.

7 Claims, 6 Drawing Figures

OPENING, FILLING AND SEALING DEVICE FOR THERMOPLASTIC BAGS

This invention relates to a bag filling and sealing apparatus and its method of use, and it particularly relates to an apparatus adapted to fill and seal thermoplastic bags.

Bags constructed of thermoplastic material, such as polyethylene, polypropylene, etc., are generally made by cutting through a strip of double-ply material at successive intervals by means of a heat knife, wire or the like, which simultaneously cuts through and heat-seals the cut edges of the overlying plys together.

Thermoplastic bags of the above type are ordinarily difficult to open because the material is such that the walls of the bag, which were originally part of the two overlapped plys, have a great adherence to each other. This is an especially disadvantageous feature when the bags are used in commercial production where they must be opened, filled and sealed in the most expeditious manner in order to make the process commercially feasible.

It is an object of the present invention to overcome the aforesaid difficulties by providing a method and apparatus which rapidly and efficiently opens thermoplastic bags, fills them and seals them.

Another object of the present invention is to provide a method and apparatus of the aforesaid type wherein the necessity of using skilled labor is obviated and the amount of labor required is kept to a minimum.

Another object of the present invention is to provide an apparatus of the aforesaid type which is simple and inexpensive in construction and easy and economical to use.

Other objects and many of the attendant advantages of this invention will be readily appreciated as the same becomes better understood by reference to the following description when read in conjunction with the accompanying drawings wherein:

FIG. 2 is a front elevational view of a bag used with the present device.

Figures 1, 3:
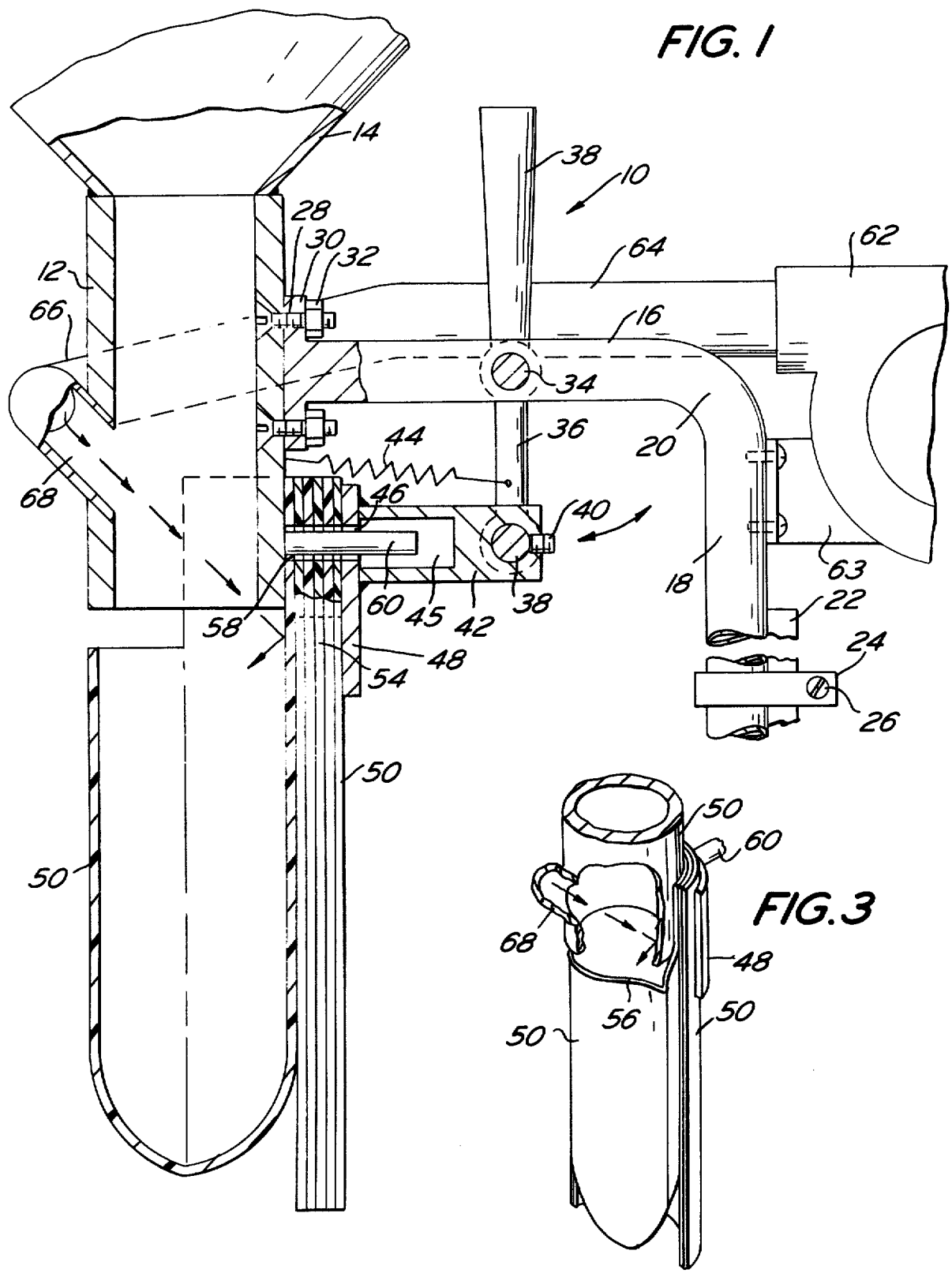
FIG. 1 is side view, partly in section and partly in elevation, of an opening and filling device embodying the present invention.
FIG. 3 is a fragmentary top perspective view of a bag held in the filling position shown in FIG. 1.

Referring now in greater detail to the various figures of the drawings wherein similar reference characters refer to similar parts, there is shown in FIG. 1 an opening and filling device, generally designated 10, comprising a chute 12 having a funnel 14. The chute 12 is supported on a horizontal portion 16 of a bracket 18 the vertical portion of which is connected to the horizontal portion by an elbow portion 20. The vertical portion of the bracket 18 is clamped to a supporting post 22 by a pair of clamps 24 held in clamping position by bolts 26.

The horizontal portion 16 of the bracket 18 is connected to the chute 12 by bolts 28 which extend through a flange 30 on the end of portion 16 into threaded apertures in the wall of the chute. Nuts 32 hold the bolts in place.

Pivotally mounted on the bracket portion 16, as at 34, is a lever 36 having a handle 38. The lower end of the lever 36 is provided with socket portion fixed around a rod 38 by a lockscrew 40. The rod 38 is in engagement with a block 42 which is longitudinally movable toward and away from the chute 12 by actuation of the lever handle 38. A spring 44 is connected between the lever 36 and the chute 12 and acts to bias the block 42 toward the chute.

The block 42 is provided with a recess 45 which mates with an aperture 46 in a clamping plate 48 that is connected to the front end of the block. The clamping plate 48 is curved to conform to a substantial portion (generally about one-half) of the outer circumference of the chute 12.

Between the curved clamping plate 48 and the outer wall of the chute is a package of thermoplastic bags 50. The package comprises a plurality of overlying bags 50, each of which has a selvage portion 52 separated from the rear wall of the bag by a perforated line 54. The front wall of the bag has an upper edge 56 which is lower than the perforated line 54, whereby when the bag is torn away from the selvage portion 52, the rear wall extends above the front wall and the upper edge of the front wall forms a lip. At least one hole 58 extends through the selvage portion of each bag, these holes 58 being in alignment with each other when the bags are placed one above the other in the package.

Connected to the outer surface of the chute 12 is a laterally-extending pin 60. The pin 60 is adapted to extend through the holes 58 in the bags whereby the pin serves as a hanger for the bags. The pin 60, furthermore, is adapted to extend into the recess 45 of the block 42 when the block 42 is moved toward the chute. The curved clamping plate 48 acts to clamp the bags against the outer wall of the chute under the resilient pressure of the spring 44, while the bags hang from the pin 60.

The primary means for opening the front bag of the pack in preparation for insertion of the filler is a blast of air or similar gaseous substance. This air blast, which, especially for small bags, should be of the low pressure, low velocity type, is produced by a blower 62 which is mounted on the bracket 18 by any means, such as indicated at 63, and is open to the atmosphere or connected to a source of other gas. The blower forces the air through a hose or other conduit 64 which is provided with an elbow portion 66. The elbow portion 66 is releasably connected to an inlet duct 68. The duct 68 is directed at an angle into the chute 12. The particular angle is highly important since it must be such that the direction of flow through the chute is at an angle between the lip or edge 56 of the front wall of the bag and the rear wall of the bag below the selvage portion 52. This blast of air initially forces the front wall of the bag away from the rear wall to open the mouth of the bag, and then the continued flow of the air down through the length of the bag serves to open the remainder of the bag. In this operation, the fact that the clamping plate 48 conforms to about half the circumference of the chute, is an aid to opening of the bag mouth since by bending the bags partially around the chute, a lateral force is applied to the bag which causes the lip or upper edge of the front wall to slightly separate from the rear wall. Although the separation would not, in itself, ordinarily be enough to open the mouth of the bag to receive the filler, it is enough to provide an opening to receive the blast of air which, thereupon, does open the mouth to a sufficient extent.

Immediately upon the bag being opened by the blast of air, a filler, which may be a solid, liquid or powder, is inserted through the funnel 14 and drops down through the chute 12 into the bag. The bag is then removed from its selvage portion 52, which is still held clamped to the chute, by tearing away at the perforated line 54, and may, thereafter be sealed by heat sealing at the mouth or by any other desired means. The blast of air from the blower 62 may be a continual stream which immediately acts upon the bag as the bag is clamped in position, or it may be in the form of pulsations which are timed in accordance with the positioning of each bag and the insertion of the filler. In this respect, the fillers may be brought successively to the funnel 14 by a conveyor of any desired type and caused to fall into the funnel between blasts of air. Any standard timing means may be used for this type of arrangement.

The entire device is vertically adjustable by means of opening the clamps 24 and moving the bracket up or down on the post 22 to the desired position, after which the clamps 24 are again tightened.

The entire device may be portable and may be mounted in any position on the floor, on a table, or on any other support means. If desired, the post 22 may be fixed to a plate or the like mounted on a table or other support, and the plate may be laterally, rotatably or both laterally and rotatably adjustable on the support so that the device may be horizontally adjusted to any desired position.

Although a pack of bags has been illustrated, the device is equally as well suitable for single bags which are individually clamped in place, or for bags in linear connection or roll form. Furthermore, although the funnel 14 and the chute 12 have been shown and described as being round, they may be square, rectangular, oval, or any other desired shape to fit the type of filler being used. In addition, the chute may be of any size desired and different sizes and shapes of chutes may be substituted for one another by merely removing the bolts 28 to permit replacement. In all events, the clamping plate 48 could be changed, either by making it separable from the block 42 or replacing the entire block together with its clamping plate, so that when so desired, the clamping plate would conform to the circumferential size and shape of the chute.

The device has been described as having a vertical chute with the remaining parts associated with such position. However, the chute may be placed in a slanted or even a horizontal position if it is so desired. Furthermore, the invention has been described as especially adapted to the filling of thermoplastic bags. Although this is true, it is equally as well adapted to use with bags made of paper, fabric, other types of plastic or any other desirable and feasible material.

Although a single air supply is shown with each individual chute, it is within the scope of this invention to use a plurality of chutes and to have a single air supply or blower means provided with conduits connected to each chute.

Figure 4:
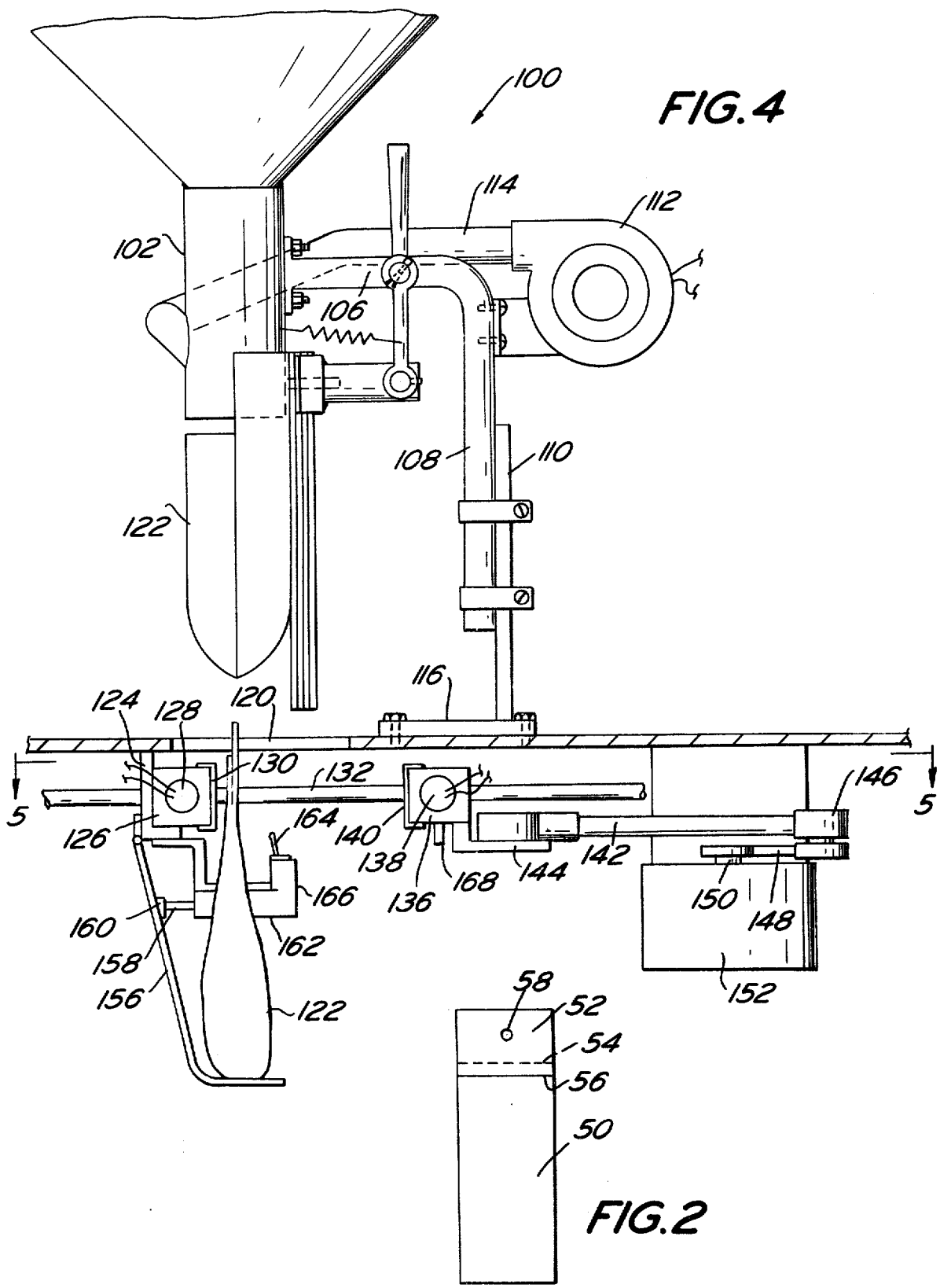
FIG. 4 is a side elevational view of the device of FIG. 1 mounted on a support and sealing means.
Figure 5:
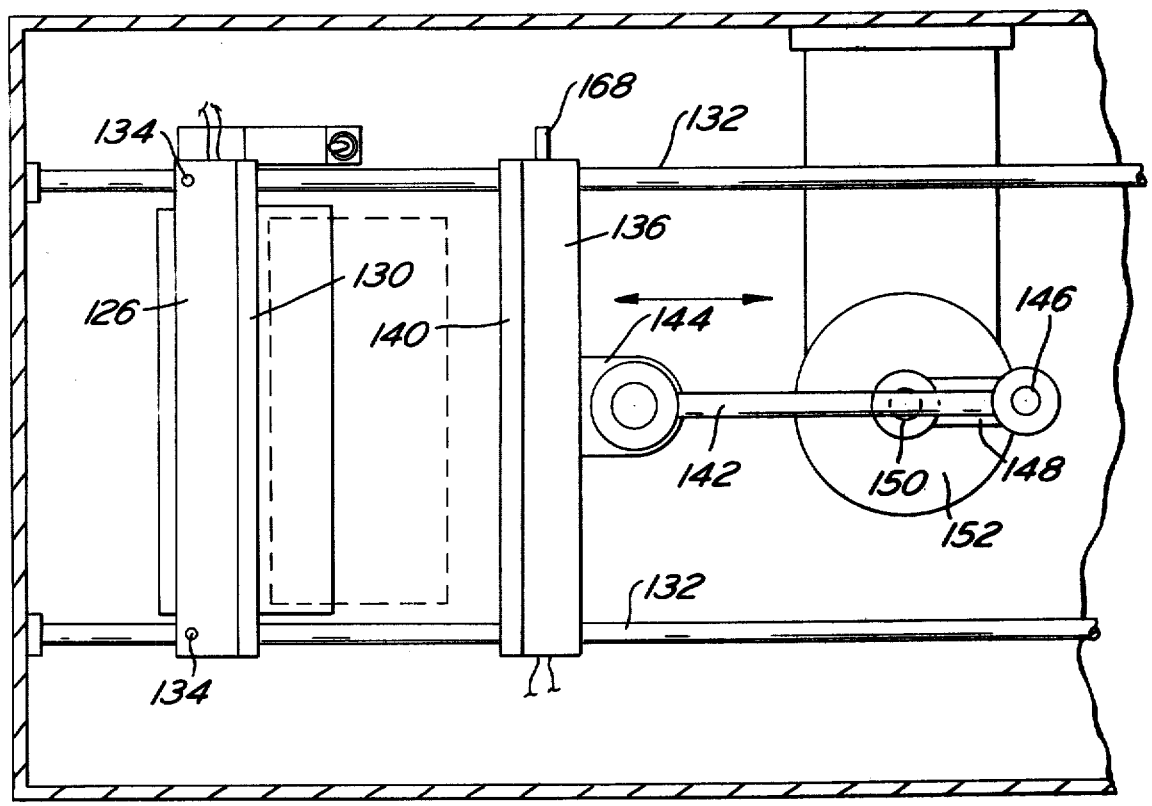
FIG. 5 is a sectional view taken on line 5—5 of FIG. 4.

In FIGS. 4 and 5 there is shown a filler device such as shown in FIG. 1, in combination with an automatic sealing means coacting therewith. The filling means, generally designated 100 is identical to that shown in FIG. 1 and includes a chute 102 having a funnel 104, the chute being mounted on the horizontal arm 106 of a bracket 108 vertically adjustable on a post 110. A blower 112 provides blasts of air to the chute through a conduit 114.

The post 110 is mounted on a plate 116 bolted or otherwise secured to a table top 118. The table top 118 is provided with an aperture 120 underlying the hanging bag 122. Mounted on the underside of the table top 118, forwardly of the aperture 120, is a bracket 124 which holds a block 126 in which is positioned an electric heating element 128. A heat-sealing plate 130 is positioned at the rear side of heating means 126.

A pair of guide rods 132 are fixed to the sides of the table, these rods passing through corresponding apertures in the block 126 which is fixed thereto by screws or the like indicated at 134. Slidable on the rods 132 is a block 136 having an electric heating element 138. The heating elements 128 and 138 are connected to a source of electrical energy by flexible wires or any other desirable means. A heating plate 140 is positioned on the front side of block 140.

The block 136 is movable toward and away from the block 126 by a crank arm 142 pivoted to a bracket 144 connected to the block 136. The crank arm 142 is pivotally connected at 146 to a crank lever 148 connected to the shaft 150 of an electric motor 152.

Pivotally connected to the underside of bracket 124, as at 154, is a bag support platform 156. This platform 156 is normally in the position shown in FIG. 4 wherein it acts to support a filled bag 122 that has been severed from its selvage portion and has dropped through the aperture 120. When supported in this manner, the neck of the bag is in position to be sealed by the heated plates 130 and 140.

After the bag has been sealed, it must be quickly removed to permit the next filled bag to drop into the same position. This is accomplished by a solenoid arm 158 connected to the platform at 160. The solenoid arm 158 is actuated by a solenoid within a housing 162 to push the pivoted shelf to the left (as seen in FIG. 4) to permit the sealed bag to drop into a chute or the like. The solenoid is actuated by a switch extension 164 connected to a switch (not shown) positioned in a switch housing 166, the switch being closed when it is contacted by a switch actuator 168 mounted on the block 136. In this manner, as the heated plate 140 moves into the sealing position, it automatically moves the switch extension 164 to actuate the switch which actuates the solenoid to move the platform 156 out of bag-retaining position to permit the sealed bag to drop out of the way. Since the solenoid is biased to keep the platform in retaining position, as soon as the block 136 moves back, the platform moves back into retaining position for the next bag.

If fully automatic operation is desired, the fillers may be moved by a conveyor, chute, or any other desired means toward the funnel 104 and the manually operated handle and lever may be replaced by a motor-operated crank means similar to that shown at 142 and 148. This crank means may be actuated by motor 152 or a separate motor in timed relation with the crank means 142 and 148. The conveyor and air blast means may also be actuated in timed relationship therewith.

Figure 6:
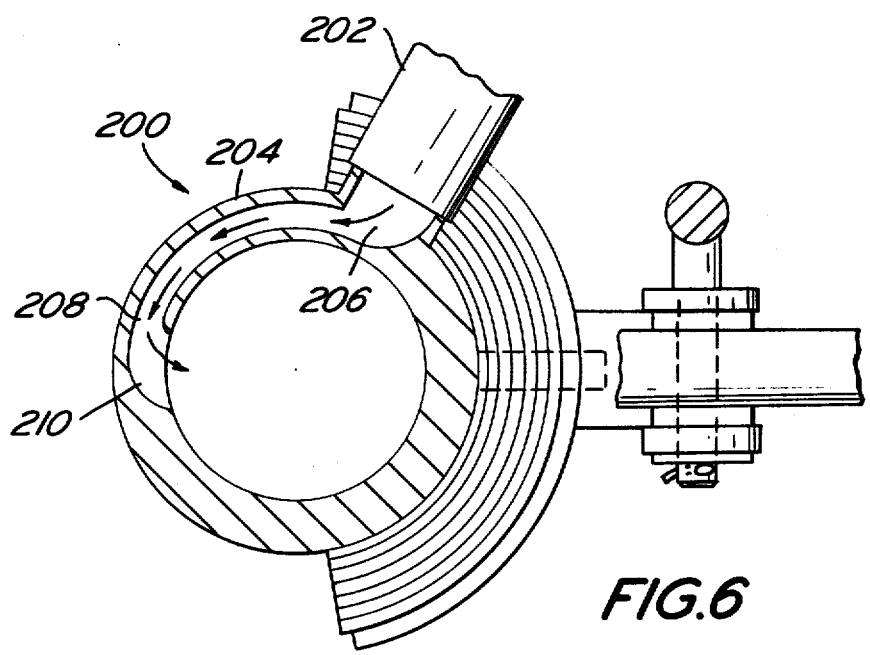
FIG. 6 is a cross-sectional view of a modified form of the invention.

In FIG. 6 there is shown a modification of the device, indicated generally at 200, wherein, instead of a separate elbowed conduit or hose such as shown at 66 and inlet such as shown at 68 in FIG. 1, the conduit 202, similar to conduit 64, is connected internally of the circumferential wall of chute 204, similar to chute 12, with an internal inlet 206. The inlet 206 is continuous with an interval channel 208 which extends partially around the circumference of the chute and is provided with an outlet 210 leading into the interior of the chute. This inlet 210 is inclined to project the air blast at a downward angle similar to that shown in FIG. 1. This construction eliminates the need for the elbow 66 and inlet 68 which occupy extra space outside the chute and which may be damaged by outside obstructions.

The invention claimed is:

1. A filling device for open-mouthed bags having a lip defining a portion of the mouth and an extending rear wall portion which extends beyond said lip, said device comprising a hollow chute having an inlet end and an outlet end, and having a predetermined cross-sectional contour, a bag support means connected to one wall portion of said chute adjacent the outlet end thereof and extending laterally outward from said one wall portion, said bag support means being constructed and arranged to support at least one of said open-mouthed bags, adjacent the extending rear wall portion thereof, in such a manner that the lip thereof is spaced from said outlet end of said chute, a clamping means outside said chute, said clamping means being movable laterally of said one wall portion of said chute and being constructed and arranged to clamp a portion of said bag, while said bag is supported by said bag support means, against said one wall portion in a manner to conform said portion of said bag to the cross-sectional contour of said one wall portion, a fluid inlet means being constructed and arranged to propel a gaseous fluid through said chute and into said bag over the lip of said bag while said portion of said bag is held against said one wall portion by said clamping means, and gaseous fluid supply means operatively connected to said fluid inlet means, said fluid inlet means comprising a channel in a second wall portion of said chute, said channel having an inlet portion connected to a conduit means extending into said second wall portion of said chute and an outlet extending laterally from said channel through a corresponding aperture in said second wall portion, said conduit means being connected to said gaseous fluid supply means.

2. A filling device for open-mouthed bags having a lip defining a portion of the mouth and an extending rear wall portion which extends beyond said lip, said device comprising a hollow chute having an inlet end and an outlet end, and having a predetermined cross-sectional contour, a bag support means connected to one wall portion of said chute adjacent the outlet end thereof and extending laterally outward from said one wall portion, said bag support means being constructed and arranged to support at least one of said open-mouthed bags, adjacent the extending rear wall portion thereof, in such a manner that the lip thereof is spaced from said outlet end of said chute, a clamping means outside said chute, said clamping means being movable laterally of said one wall portion of said chute and being constructed and arranged to clamp a portion of said bag, while said bag is supported by said bag support means, against said one wall portion in a manner to conform said portion of said bag to the cross-sectional contour of said one wall portion, a fluid inlet means operatively connected to said chute, said fluid inlet means being constructed and arranged to propel a gaseous fluid through said chute and into said bag over the lip of said bag while said portion of said bag is held against said one wall portion by said clamping means, and gaseous fluid supply means operatively connected to said fluid inlet means, said device being mounted on a support means, said support means having an aperture in alignment with said outlet end of said chute, said aperture being constructed and arranged to permit passage therethrough of a filled bag when said filled bag is released from said chute, heating means connected to said support means, said heating means being constructed and arranged to apply heat to the neck of said filled bag as said filled bag is positioned below said aperture, said neck being that portion of the bag adjacent to said lip, and means to move at least a portion of said heating means into and out of operative position relative to said neck.

3. The device of claim 2 wherein a movable bag support platform is operatively connected to said support means, said platform being in alignment with said aperture but on the side of said support means remote from said chute, said platform being constructed and arranged to normally support a filled bag after said filled bag passes through said aperture, and release means to move said platform away from its supporting position at predetermined intervals.

4. The device of claim 3 wherein said release means is actuated by said heating means.

5. In a filling device for filling thermoplastic open-mouthed bags, wherein said device comprises a filling means and a sealing means, said filling means comprising a chute having an inlet end and an outlet end and a bag support means extending laterally outward from said chute adjacent said outlet end, and a clamping means constructed and arranged to clamp said bag against said chute while said bag is supported by said support means in a manner to place the mouth of said bag in line with said outlet end of said chute, said support means and clamping means supporting a bag above said sealing means while said bag is being filled and permitting release of said bag after it has been filled, said sealing means comprising a supporting means having an aperture in alignment with said bag while it is being filled, said aperture being constructed and arranged to permit passage therethrough of the filled bag after it has been released, heating means connected to said supporting means, a bag support platform constructed and arranged to releasably support the filled bag after it has passed through said aperture, said heating means being constructed and arranged to apply heat to the neck of said filled bag after said filled bag has passed through said aperture and while it is supported by said bag support platform, said neck being that portion of the filled bag adjacent to its open mouth, and means to move at least a portion of said heating means into and out of operative position relative to said neck.

6. The device of claim 5 wherein said bag support platform is a movable bag support platform that is operatively connected to said supporting means, said platform being in alignment with said aperture, said platform being constructed and arranged to normally support the filled bag after it has passed through said aperture, and release means to move said platform away from its supporting position at predetermined intervals.

7. The device of claim 6 wherein said release means is actuated by said heating means.

* * * * *